UNITED STATES PATENT OFFICE.

BERTRAND LACLAVERIE, OF NEW ORLEANS, LOUISIANA, ASSIGNOR OF ONE-FOURTH TO HENRY TREMOULET, OF SAME PLACE.

DISINFECTANT.

SPECIFICATION forming part of Letters Patent No. 361,636, dated April 19, 1887.

Application filed December 15, 1886. Serial No. 221,671. (No specimens.)

*To all whom it may concern:*

Be it known that I, BERTRAND LACLAVERIE, a citizen of the United States, residing at New Orleans, in the parish of Orleans and State of Louisiana, have invented certain new and useful Improvements in a Composition for Disinfecting Stores, Residences, Privies, and Vessels; and I do declare the following to be a full, clear, and exact description of the invention, such as will enable others skilled in the art to which it appertains to make and use the same.

My composition consists of the following ingredients, combined in the proportions stated, viz: pure water, fifty gallons; tar, forty gallons; lime, one hundred pounds; cape aloes, twenty pounds; aqua-ammonia, ten pounds, borax, five pounds; sal-soda, five pounds. These ingredients are to be thoroughly mingled by agitation.

In using the above-named composition the place desired to be disinfected should first be freed from all decomposing matter and impurities, if possible, and then place the solution in the closet, or other locality desired, in such quantities as required, either by sprinkling or pouring, when all vapors or gases are deodorized, and all stench is temporarily removed.

By the use of the above composition sinks, privies, water-closets, &c., in stores, dwellings, and vessels are thoroughly cleansed.

I am aware that a composition consisting of water, lime, and sulphur has been used for the same purpose. I am also aware that carbolic acid has been used as a disinfectant; but I am not aware that all of the ingredients of my composition, in the proportions stated, have been used together.

What I claim, and desire to secure by Letters Patent of the United States, is—

The herein-described composition of matter to be used for disinfecting stores, residences, privies, and vessels, consisting of water, tar, lime, cape aloes, aqua-ammonia, borax, and sal-soda, in the proportions specified.

In testimony whereof I affix my signature in presence of two witnesses.

BERTRAND LACLAVERIE.

Witnesses:
GEORGE J. YENEWINE,
GEO. MONTGOMERY.